United States Patent
Ryu et al.

(10) Patent No.: US 9,419,283 B2
(45) Date of Patent: Aug. 16, 2016

(54) NON-AQUEOUS LITHIUM SECONDARY BATTERY CONTAINING HYDROPHOBIC, INACTIVE PARTICLE

(75) Inventors: Ji Heon Ryu, Seoul (KR); Jung Eun Hyun, Seoul (KR); Eun Ju Lee, Daejeon (KR); Hanho Lee, Daejeon (KR)

(73) Assignee: LG Chem, Ltd. (KR)

( * ) Notice: Subject to any disclaimer, the term of this patent is extended or adjusted under 35 U.S.C. 154(b) by 1544 days.

(21) Appl. No.: 12/310,343

(22) PCT Filed: Aug. 4, 2007

(86) PCT No.: PCT/KR2007/003760
§ 371 (c)(1),
(2), (4) Date: Sep. 17, 2009

(87) PCT Pub. No.: WO2008/023890
PCT Pub. Date: Feb. 28, 2008

(65) Prior Publication Data
US 2010/0015523 A1 Jan. 21, 2010

(30) Foreign Application Priority Data
Aug. 21, 2006 (KR) .................. 10-2006-0078499

(51) Int. Cl.
| | |
|---|---|
| H01M 4/62 | (2006.01) |
| H01M 4/02 | (2006.01) |
| H01M 4/13 | (2010.01) |
| H01M 10/052 | (2010.01) |
| H01M 10/42 | (2006.01) |
| H01M 4/131 | (2010.01) |
| H01M 4/133 | (2010.01) |

(52) U.S. Cl.
CPC ........ *H01M 4/62* (2013.01); *H01M 4/13* (2013.01); *H01M 10/052* (2013.01); *H01M 10/4235* (2013.01); *H01M 4/131* (2013.01); *H01M 4/133* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| | | | |
|---|---|---|---|
| 6,337,132 B1 | 1/2002 | Kajiyama et al. | |
| 6,821,675 B1 | 11/2004 | Morigaki et al. | |
| 2002/0172868 A1* | 11/2002 | Manna et al. | 429/232 |
| 2004/0121234 A1* | 6/2004 | Le | 429/231.1 |

FOREIGN PATENT DOCUMENTS

| | | | | |
|---|---|---|---|---|
| EP | 1575104 | * | 9/2005 | ........... H01M 4/02 |
| JP | 1995263026 | | 10/1995 | |
| JP | 1996111243 | | 4/1996 | |
| JP | 1999073969 | | 3/1999 | |
| JP | 2000-173608 A | | 6/2000 | |
| JP | 2000-264636 A | | 9/2000 | |
| JP | 2000-281354 A | | 10/2000 | |
| JP | 2001-093498 A | | 4/2001 | |
| JP | 2002-015728 A | | 1/2002 | |
| JP | 2004296108 A | | 10/2004 | |
| JP | 2005141111 A | | 6/2005 | |
| JP | 2006024550 A | | 1/2006 | |
| KR | 1995-0002099 A | | 1/1995 | |
| KR | 2005-0086935 A | | 8/2005 | |
| WO | 2005011044 A1 | | 2/2005 | |

OTHER PUBLICATIONS

Cabot, CABO-O-SIL TS-530 Treated Fumed Silica cut-sheet (2004).*
International Search Report issued on Nov. 12, 2007 in connection with corresponding International Application No. PCT/KR2007/003760.

* cited by examiner

*Primary Examiner* — Yoshitoshi Takeuchi
(74) *Attorney, Agent, or Firm* — Lerner, David, Littenberg, Krumholz & Mentlik, LLP

(57) ABSTRACT

Provided is a non-aqueous lithium secondary battery comprising an electrode assembly composed of a cathode, an anode, and a separator interposed between the cathode and anode, wherein the cathode and anode have an electrode material containing an active material applied on a current collector, a non-aqueous electrolyte containing a lithium salt, hydrophobic inactive-particles (also, referred to as "hydrophobic particles") included in the electrode material, and a battery case sealing all the constituent components. Upon adding hydrophobic inactive-particles to the electrode material in a non-aqueous lithium secondary battery, absorption and inflow of water into the electrode material during the battery production is effectively inhibited such as to prevent side reactions caused by water inside the battery, thereby exhibiting improvement in the high-temperature storage characteristics of the battery.

5 Claims, No Drawings

NON-AQUEOUS LITHIUM SECONDARY BATTERY CONTAINING HYDROPHOBIC, INACTIVE PARTICLE

CROSS REFERENCE TO RELATED APPLICATIONS

The present application is a national phase entry under 35 U.S.C. §371 of International Application No. PCT/KR2007/003760, filed Aug. 4, 2007, published in English, which claims priority from Korean Patent Application No. 10-2006-0078499, filed Aug. 21, 2006. The disclosures of said applications are incorporated by reference herein.

FIELD OF THE INVENTION

The present invention relates to a non-aqueous lithium secondary battery containing hydrophobic inactive-particle. More specifically, the present invention relates to a non-aqueous lithium secondary battery comprising an electrode assembly composed of a cathode, an anode, and a separator interposed between the cathode and anode, wherein the cathode and anode have an electrode material containing an active material applied on a current collector, a non-aqueous electrolyte containing a lithium salt, hydrophobic inactive-particles (also, referred to as "hydrophobic particles") included in the electrode material, and a battery case sealing all the constituent components.

BACKGROUND OF THE INVENTION

Technological development and increased demand for mobile equipment have led to a rapid increase in the demand for secondary batteries as an energy source. Among other things, a great deal of research and study has been focused on lithium secondary batteries having high-energy density and high-discharge voltage. These lithium secondary batteries are also commercially available and widely used.

Generally, the lithium secondary battery is comprised of a structure having an electrode assembly composed of a cathode and an anode and a porous separator interposed between the cathode and anode, wherein the cathode and anode have an electrode material containing an active material is applied on a current collector, and impregnation of the electrode assembly with a non-aqueous electrolyte containing a lithium salt. As examples of the cathode, the use can be made mainly of lithium-cobalt oxides, lithium-manganese oxides, lithium-nickel oxides, lithium composite oxides, or the like, whereas for the anode, the use can be made mainly of carbonaceous materials.

Such a lithium secondary battery, for example, when the water content increases inside the battery, the degradation of an electrolyte is induced thereby producing acids. Thus produced acids facilitate a side reaction such as degradation of solid electrolyte interface (SEI) at the anode or dissolution of a cathode active material. Ultimately, problems such as reduction of a battery capacity and increase in the internal resistance are induced. That is, since the performance of a lithium secondary battery is influenced greatly by the water content inside the battery, it is most important to prevent the water from penetrating into the battery during the battery production.

Therefore, in the present invention, hydrophobic particles are contained in the electrode material so as to exert hydrophobicity throughout the constituent components of the battery. Thereby, the present invention provides a technique to minimize absorption and inflow of water during the battery production.

In this connection, Japanese Patent Laid-Open Publication No. 2001-093498 discloses a technique for producing a separator by mixing a polyolefin resin and an inorganic powder whose surface is hydrophobized with chlorosilane or silazane. In this technique, the inorganic powder whose surface is hydrophobized as in the above is added to the separator so as to complement hydrophilicity of the inorganic substance included for preventing the separator from excessively melting upon exerting the shut-down function. However, the separator material itself is usually hydrophobic. Thus, unless a hydrophilic inorganic substance is further added to the separator, the technique for giving hydrophobicity to the separator is not required.

Additionally, Japanese Patent Laid-Open Publication No. 2002-015728 discloses a technique for applying an electrode material on an electrode current collector, and then forming a hydrophobic substance layer on the surface of the electrode material in order to inhibit water from penetrating into the electrode material. However, there is a limit to this technique in that it is applied to the battery production only when the process is carried out in a very low humidity condition or completely no humidity condition. That is, in this technique, penetration of water is inhibited by the hydrophobic substance layer applied on the surface of the electrode material during the battery production after applying the electrode material on the electrode current collector. Therefore, there is a problem in that water absorbed or flowed into the electrode material during the production or applying process of the electrode material is rather unable to evaporate due to the hydrophobic substance layer.

As a technique for removing water contained in an electrode material, Korean Patent Laid-Open Publication No. 1995-0002099 suggests a method for sintering an electrode material after applying the electrode material on an electrode current collector. However, in this technique, various substances such as a binder constituting the electrode material may undergo degradation reaction during the sintering. Thus, it is not preferable to apply this technique to the battery production.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have confirmed that upon adding hydrophobic inactive-particles to an electrode material in a non-aqueous lithium secondary battery, absorption and inflow of water into the electrode material during the battery production is effectively inhibited such as to prevent a side reaction caused by water inside the battery, thereby allowing improvement in the high-temperature storage characteristics of the battery. The present invention has been completed based on these findings.

DETAILED DESCRIPTION OF PREFERRED EMBODIMENTS

In accordance with an aspect of the present invention, the above and other objects can be accomplished by the provision of a non-aqueous lithium secondary battery comprising a non-aqueous lithium secondary battery comprising an electrode assembly composed of a cathode, an anode, and a separator interposed between the cathode and anode, wherein the cathode and anode have an electrode material containing an active material applied on a current collector, a non-aqueous electrolyte containing a lithium salt, hydrophobic inactive-particles included in the electrode material, and a battery case sealing all the constituent components.

The lithium secondary battery can be fabricated by installing an electrode assembly composed of a cathode, an anode, and a separator interposed between the cathode and anode in the battery case, injecting a non-aqueous electrolyte into the case, and sealing the case. Such a lithium secondary battery, especially, in the electrode production, may have water penetrated into the electrode material such that a side reaction is caused. As a result, there is a problem in that the battery performance is deteriorated when stored for a prolonged period at high temperatures. Therefore, in the present invention, by adding hydrophobic inactive-particles to the electrode material, absorption or inflow of water into the electrode material in the electrode production may be prevented, or at least inhibited as much as possible.

Types and shapes of the hydrophobic particles may vary, and there is no particular limit, as long as the particles give hydrophobicity when added to the electrode material. For example, any one or two or more particles selected from the group consisting of hydrophobic organic particles, hydrophobic inorganic particles, hydrophobic surface-coated inorganic particles, and hydrophobic surface-coated organic particles.

As examples of the hydrophobic surface-coating organic particles and the hydrophobic surface-coated inorganic particles, mention may be made of hydrophilic organic or inorganic particles whose surfaces are supplemented with hydrophobicity by coating a hydrophobic organic substance on the surfaces. Among these, hydrophilic inorganic particles whose surfaces are coated with a hydrophobic organic substance are particularly preferable. A method for coating the hydrophobic organic substance on the surface of the hydrophilic inorganic particles may be performed with various surface treatment methods. Since the surface treatment methods are widely known in this field of art, the detailed description thereof will be omitted in the present specification.

The hydrophilic inorganic particles are a substance that can maintain a thermal, chemical and electrochemical stability in the battery. For example, the hydrophilic inorganic particles may be any one or two or more inorganic oxide particles selected from the group consisting of $SiO_2$, $Al_2O_3$, MgO, $TiO_2$, $ZrO_2$, CaO, $Y_2O_3$, and SrO. Among these, $SiO_2$ is preferable.

Types of the hydrophobic organic particles and the hydrophobic organic substance coated on the surface of hydrophilic inorganic particles may vary, and the mention can be made of, but not limited to, hydrophobic polymers such as PE, PP, PS, PVdF, PTFE, PET, PMMA, PAN, and hydrophobic silane-based compounds such as HMDS (hexamethyldisilazne), TMSCL (trimethylchlorosilane), PDMS (polydimethylsiloxane), DDS (dimethyldichlorosilane). Among these, the hydrophobic silane-based compounds are particularly preferable.

According to the experiment results performed by the inventors of the present invention, when the content of the hydrophobic particles exceed the predetermined content based on the electrode material, it is confirmed that the hydrophobic particles functions as an electric resistance instead of exerting a water penetration inhibition effect, thereby having a bad influence on the rate characteristics of the battery. Therefore, in order to improve the high-temperature storage characteristics via moisture proof properties while maintaining the rate characteristics of the battery, the hydrophobic particles may be preferably contained in the amount of 0.1 to 5% by weight based on the total weight of the electrode material. Specifically, the hydrophobic particles may be contained in a cathode material in the amount of 0.1 to 5% by weight based on the total weight of the cathode material and/or anode material in the amount of 0.1 to 5% by weight based on the total weight of the anode material.

There is no particular limit to the size of the hydrophobic particles, and the particle size of 1 nm to 100 µm is preferable in consideration of the shape of components constituting the electrode material and ease of application of the electrode material slurry.

In accordance with another aspect of the present invention, the above and other objects can be accomplished by the provision of an electrode material for a non-aqueous lithium secondary battery comprising an electrode active material, a binder, a conductive material, and the above-mentioned hydrophobic inactive-particles.

Hereinafter, the other remaining components necessary for the lithium secondary battery according to the present invention will be described in more detail.

The cathode is, for example, fabricated by applying a mixture of a cathode active material, a conductive material and a binder to a cathode current collector, followed by drying. If necessary, a filler may be further added to the above mixture.

Examples of the cathode active materials that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ (0≤x≤0.33), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides of Formula $LiNi_{1-x}M_xO_2$ (M=Co, Mn, Al, Cu, Fe, Mg, B or Ga, and 0.01≤x≤0.3); lithium manganese composite oxides of Formula $LiMn_{2-x}M_xO_2$ (M=Co, Ni, Fe, Cr, Zn or Ta, and 0.01≤x≤0.1), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The cathode current collector is generally fabricated to have a thickness of 3 to 500 µm. There is no particular limit to materials for the cathode current collector, so long as they have high conductivity without causing chemical changes in the fabricated battery. Examples of materials for the cathode current collector include stainless steel, aluminum, nickel, titanium, sintered carbon, and aluminum or stainless steel which was surface-treated with carbon, nickel, titanium or silver. The cathode current collector may be fabricated to have fine irregularities on the surface thereof so as to enhance adhesive strength to the cathode active material. In addition, the cathode current collector may take various forms including films, sheets, foils, nets, porous structures, foams and non-woven fabrics.

The conductive material is typically added in an amount of 1 to 50% by weight, based on the total weight of the mixture including the cathode active material. There is no particular limit to the conductive material, so long as it has suitable conductivity without causing chemical changes in the fabricated battery. Examples of conductive materials include conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder, conductive whiskers such as zinc oxide and potassium titanate; conductive metal oxides such as titanium oxide; and polyphenylene derivatives.

The binder is a component assisting in binding between the active material and conductive material, and in binding with the current collector. The binder is typically added in an amount of 1 to 50% by weight, based on the total weight of the mixture including the cathode active material. Examples of the binder include polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. Examples of the filler include olefin polymers such as polyethylene and polypropylene; and fibrous materials such as glass fiber and carbon fiber.

The anode is fabricated by applying anode materials to the anode current collector, followed by drying. If necessary, other components as described above may be further included.

Examples of the anode active materials utilizable in the present invention include carbon such as non-graphitizing carbon and graphite-based carbon; metal composite oxides such as $Li_xFe_2O_3$ (0≤x≤1), $Li_xWO_2$(0≤x≤1) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; 0<x≤1; 1≤y≤3; and 1≤z≤8); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The anode current collector is generally fabricated to have a thickness of 3 to 500 μm. There is no particular limit to materials for the anode current collector, so long as they have suitable conductivity without causing chemical changes in the fabricated battery. Examples of materials for the anode current collector include copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesive strength to the anode active material. In addition, the anode current collector may be used in various forms including films, sheets, foils, nets, porous structures, foams and non-woven fabrics.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and lithium. As the non-aqueous electrolyte, a non-aqueous electrolytic solution, solid electrolyte and inorganic solid electrolyte may be utilized.

Examples of the non-aqueous electrolytic solution that can be used in the present invention include aprotic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte utilized in the present invention include nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following Examples. These examples are provided only for illustrating the present invention and should not be construed as limiting the scope and spirit of the present invention.

Example 1

95% by weight of $LiCoO_2$ as a cathode active material, 2.5% by weight of Super-P as a conductive material, and 2.5% by weight of PVDF as a binder were added to an NMP (N-methyl-2-pyrrolidone) solvent. 0.1% by weight of hydrophobic $SiO_2$, whose surface was treated with HMDS (hexamethyldisilazane), based on the total weight of the cathode active material was added to the cathode active material to prepare a cathode material. Thereafter, the cathode material was applied on an aluminum foil which was then dried and compressed, thereby preparing a cathode.

95% by weight of artificial graphite as an anode active material, 2.5% by weight of Super-P as a conductive material, and 2.5% by weight of PVdF as a binder were added to an NMP (N-methyl-2-pyrrolidone) solvent. 0.1% by weight of hydrophobic $SiO_2$, whose surface was treated with HMDS (hexamethyldisilazane), based on the total weight of the anode active material was added to the anode active material to prepare an anode material. Thereafter, the anode material was applied on a copper foil which was then dried and compressed, thereby preparing an anode.

A separator (Celgard 2400, manufactured by Hoechst Celanese Corporation) was interposed between the cathode and anode prepared in the above, and EC/EMC-based electrolyte containing a lithium salt of 1 M $LiPF_6$ was injected into the separator to prepare a lithium secondary battery.

Example 2

A lithium secondary battery was prepared in the same manner as in Example 1, except that hydrophobic $SiO_2$ was not added to the cathode.

Example 3

A lithium secondary battery was prepared in the same manner as in Example 1, except that hydrophobic $SiO_2$ was not added to the anode.

Example 4

A lithium secondary battery was prepared in the same manner as in Example 1, except that 2% by weight of hydrophobic $SiO_2$ was added to the cathode and anode.

Example 5

A lithium secondary battery was prepared in the same manner as in Example 1, except that 5% by weight of hydrophobic $SiO_2$ was added to the cathode and anode.

Comparative Example 1

A lithium secondary battery was prepared in the same manner as in Example 1, except hydrophobic $SiO_2$ was not added to the cathode and anode.

Comparative Example 2

A lithium secondary battery was prepared in the same manner as in Example 1, except that 7% by weight of hydrophobic $SiO_2$ was added to the cathode and anode.

Comparative Example 3

A lithium secondary battery was prepared in the same manner as in Example 1, except that 10% by weight of hydrophobic $SiO_2$ was added to the cathode and anode.

Experimental Example

Water content in the electrode prepared in the respective Examples 1 to 5 and Comparative Examples 1 to 3 was measured and presented in the following Table 1.

1. Evaluation Experiment of High-Temperature Storage Characteristics

The batteries prepared in the respective Examples 1 to 5 and Comparative Examples 1 to 3 were stored for 2 weeks at 60° C. at full charge. Then, the capacity after storage of each battery was measured and presented in the following Table 1 in the ratio with respect to the initial capacity.

2. Evaluation Experiment of Rate Characteristics

The batteries prepared in the respective Examples 1 to 5 and Comparative Examples 1 to 3 were charged to 4.2 V. Then, the capacity of each battery when discharged at the current of 0.5 C and 5 C, respectively, was measured and presented in the following Table 1 in the ratio of 0.5 C to 5 C.

TABLE 1

| | $SiO_2$ content in cathode (wt %) | $SiO_2$ content in anode (wt %) | Water content in cathode (ppm) | Water content in anode (ppm) | Capacity ratio after storage at high-temperatures | Discharge capacity ratio (0.5 C./5 C.) |
|---|---|---|---|---|---|---|
| Example 1 | 0.1 | 0.1 | 180 | 80 | 83 | 80 |
| Example 2 | 0 | 0.1 | 245 | 80 | 80 | 82 |
| Example 3 | 0.1 | 0 | 180 | 145 | 81 | 83 |
| Example 4 | 2 | 2 | 168 | 73 | 83 | 79 |
| Example 5 | 5 | 5 | 160 | 60 | 84 | 77 |
| Comparative Example 1 | 0 | 0 | 520 | 150 | 71 | 84 |
| Comparative Example 2 | 7 | 7 | 155 | 55 | 84 | 68 |
| Comparative Example 3 | 10 | 10 | 150 | 50 | 84 | 65 |

As can be seen from Table 1, batteries of Examples 1 to 5 according to the present invention exhibited a significant decrease in the water content of the cathode and anode. The capacity ratio of the batteries after the storage at high temperatures with respect to the initial capacity was at least 80%, which was very high. The discharge capacity ratio, which is a capacity ratio at a low current with respect to a high current, was at least 75%, which was also very high. That is, by adding hydrophobic particles to the cathode material and/or anode material, it was confirmed that a side reaction in the battery due to water was inhibited at high-temperature storage, thereby improving the capacity characteristics. On the contrary, it was known that the battery of Comparative Example 1 exhibited very high water content in the cathode and anode and significant decrease in the capacity after the storage at high temperatures compared with the initial capacity.

Additionally, as with the batteries of Comparative Examples 2 and 3, when the content of the hydrophobic particles exceeded the range of 5% by weight, the capacity ratio at high-temperature storage did not further increase. On the contrary, it was known that the discharge capacity ratio at the low current with respect to the high current decreased. That is, the exceeding content of the hydrophobic particles functioned as a resistance inside the electrode thereby blocking the flow of electricity. Therefore, it is preferable to add the hydrophobic particles to the cathode or anode as in Examples 2 and 3 or to the cathode and anode by adjusting the content in the range according to Examples 1, 4 and 5.

INDUSTRIAL APPLICABILITY

As apparent from the above description, upon adding hydrophobic inactive-particles to an electrode material in a non-aqueous lithium secondary battery, absorption and inflow of water into the electrode material during the battery production is effectively inhibited such as to prevent side reactions caused by water inside the battery, thereby allowing improvement in the high-temperature storage characteristics of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A non-aqueous lithium secondary battery comprising:
   (1) an electrode assembly comprising
      (1.a) a cathode,
      (1.b) an anode,
      (1.c) a separator interposed between the cathode and the anode, and hydrophobic particles for inhibiting absorption and inflow of water,
         wherein the hydrophobic particles comprise hydrophilic inorganic particles whose surfaces are coated with a hydrophobic silane-based compound selected from the group consisting of HMDS, TMSCL, PDMS, DDS, and combinations thereof;
   (2) a non-aqueous electrolyte containing a lithium salt; and
   (3) a battery case sealing all the constituent components,
   wherein
      the anode comprises an anode material applied on an anode current collector and
      the cathode comprises a cathode material applied on a cathode current collector,
      wherein
         the anode material comprises an anode active material, a binder, and the hydrophobic particles in an amount of 0.1 to 5% by weight based on the total weight of the anode material, and
         the cathode material comprises a cathode active material, a binder, and the hydrophobic particles in an amount of 0.1 to 5% by weight based on the total weight of the cathode material
      wherein the binder of the anode is selected from the group consisting of polyvinylidene fluoride, polyvinyl alcohols, carboxymethylcellulose, starch, hydroxypropylcellulose, regenerated cellulose, polyvinyl pyrollidone, polyethylene, polypropylene, fluoro rubber, and combinations thereof.

2. The battery according to claim 1, wherein the hydrophilic inorganic particles are inorganic oxide particles selected from the group consisting of $SiO_2$, $Al_2O_3$, MgO, $TiO_2$, $ZrO_2$, CaO, $Y_2O_3$, SrO, and combinations thereof.

3. The battery according to claim 2, wherein the hydrophilic inorganic particles are $SiO_2$.

4. The battery according to claim 1, wherein the hydrophobic particles have a particle size of 1 nm to 100 μm.

5. A non-aqueous lithium secondary battery comprising:
   (1) an electrode assembly comprising
      (1.a) a cathode,
      (1.b) an anode,
      (1.c) a separator interposed between the cathode and the anode, and
      hydrophobic particles for inhibiting absorption and inflow of water,
         wherein the hydrophobic particles comprise hydrophilic inorganic particles whose surfaces are coated with a hydrophobic silane-based compound selected from the group consisting of HMDS, TMSCL, PDMS, DDS, and combinations thereof;
   (2) a non-aqueous electrolyte containing a lithium salt; and
   (3) a battery case sealing all the constituent components,
   wherein
      the anode comprises an anode material applied on an anode current collector and
      the cathode comprises a cathode material applied on a cathode current collector,
      wherein
         the anode material comprises an anode active material, a binder, a conductive material, and the hydrophobic particles in an amount of 0.1 to 5% by weight based on the total weight of the anode material, and
         the cathode material comprises a cathode active material, a binder, a conductive material, and the hydrophobic particles in an amount of 0.1 to 5% by weight based on the total weight of the cathode material
      wherein the binder of the anode is selected from the group consisting of polyvinylidene fluoride, polyvinyl alcohols, carboxymethylcellulose, starch, hydroxypropylcellulose, regenerated cellulose, polyvinyl pyrollidone, polyethylene, polypropylene, fluoro rubber, and combinations thereof.

* * * * *